United States Patent
Parker et al.

(10) Patent No.: US 9,342,483 B2
(45) Date of Patent: May 17, 2016

(54) SENSOR DATA PROCESSING

(75) Inventors: David Robert Parker, Lancashire (GB); Alexander Samson Hamilton, Lancashire (GB)

(73) Assignee: BAE SYSTEMS PLC, London (GB)

( * ) Notice: Subject to any disclaimer, the term of this patent is extended or adjusted under 35 U.S.C. 154(b) by 691 days.

(21) Appl. No.: 13/702,746

(22) PCT Filed: Aug. 5, 2011

(86) PCT No.: PCT/GB2011/051486
§ 371 (c)(1), (2), (4) Date: Dec. 7, 2012

(87) PCT Pub. No.: WO2012/022958
PCT Pub. Date: Feb. 23, 2012

(65) Prior Publication Data
US 2013/0096884 A1    Apr. 18, 2013

(30) Foreign Application Priority Data

Aug. 19, 2010 (EP) .................................. 10251463
Aug. 19, 2010 (GB) .................................. 1013870.9

(51) Int. Cl.
*H04B 1/02* (2006.01)
*G01C 11/04* (2006.01)
(Continued)

(52) U.S. Cl.
CPC ............ *G06F 17/00* (2013.01); *G06K 9/00637* (2013.01); *G06K 9/4604* (2013.01);
(Continued)

(58) Field of Classification Search
CPC ........................................................ G06T 3/00
USPC ............... 702/34, 56, 66, 139, 153, 179, 189; 348/223.1; 382/199
See application file for complete search history.

(56) References Cited

U.S. PATENT DOCUMENTS 5,265,173 A    11/1993   Griffin et al.
5,343,390 A    8/1994    Doi et al.
(Continued)

FOREIGN PATENT DOCUMENTS

EP    1 462 994 A2    9/2004
EP    2 164 027 A1    3/2010
(Continued)

OTHER PUBLICATIONS

International Search Report (PCT/ISA/210) issued on Nov. 28, 2011, by the United Kingdom Patent Office as the International Searching Authority for International Application No. PCT/GB2011/051486.
(Continued)

*Primary Examiner* — Gregory J Toatley
*Assistant Examiner* — Felix Suarez
(74) *Attorney, Agent, or Firm* — Maine Cernota & Rardin (57) ABSTRACT

Apparatus for and a method of processing sensor data, the method including: using a sensor, measuring values of a parameter over a region of interest to produce an image of the region of interest, the image having a plurality of pixels; for each pixel, determining an orientation of a gradient of the parameter, at that pixel, using the measured parameter values; for each of a plurality of predetermined ranges of gradient orientation values, determining a number of pixels that have a gradient orientation value within that range; identifying the predetermined ranges that correspond to a number of pixels above a threshold value; and for each identified predetermined range, identifying as corresponding to a feature of an object, pixels that have gradient orientation values within that predetermined range.

14 Claims, 4 Drawing Sheets

(51) Int. Cl.
*G06F 3/0484* (2013.01)
*G06F 3/0485* (2013.01)
*G06F 17/00* (2006.01)
*G06T 7/00* (2006.01)
*G06T 7/40* (2006.01)
*G06K 9/00* (2006.01)
*G06K 9/46* (2006.01)

(52) U.S. Cl.
CPC .............. *G06T7/0083* (2013.01); *G06T 7/403* (2013.01); *G06T 2207/30184* (2013.01); *G06T 2207/30188* (2013.01)

(56) References Cited

U.S. PATENT DOCUMENTS

| | | | |
|---|---|---|---|
| 5,668,888 | A | 9/1997 | Doi et al. |
| 7,133,070 | B2* | 11/2006 | Wheeler et al. ............. 348/223.1 |
| 7,231,086 | B2* | 6/2007 | Abousleman et al. ......... 382/199 |
| 7,689,060 | B2* | 3/2010 | Messina et al. ................ 382/276 |
| 2003/0081836 | A1* | 5/2003 | Averbuch et al. ............. 382/199 |
| 2003/0206231 | A1* | 11/2003 | Chen et al. ............... 348/207.99 |
| 2005/0002570 | A1 | 1/2005 | Clark et al. |
| 2005/0169531 | A1 | 8/2005 | Fan |
| 2010/0008576 | A1* | 1/2010 | Piramuthu .................... 382/173 |

FOREIGN PATENT DOCUMENTS

| | | |
|---|---|---|
| WO | WO 95/11457 A1 | 4/1995 |
| WO | WO 2010/066563 A1 | 6/2010 |

OTHER PUBLICATIONS

United Kingdom Search Report issued on May 10, 2011 for Application No. GB1013870.9.

European Search Report issued on May 3, 2011 for Application No. 10251463.5.

Sanjiv Kumar et al., "Man-Made Structure Detection in Natural Images Using a Causal Multiscale Random Field", Proceedings of the 2003 IEEE Computer Society Conference on Computer Vision and Pattern Recognition, vol. 1, Jun. 18, 2003, pp. 119-126, XP-010644889.

R.K. Satzoda et al., "Gradient Angle Histograms for Efficient Linear Hough Transform", Image Processing (ICIP), 2009 16$^{th}$ IEEE International Conference on IEEE, Nov. 7, 2009, pp. 3273-3276, XP-031628607.

A. Vailaya et al., "On Image Classification: City Images Vs. Landscapes", Pattern Recognition, vol. 31, No. 12, Dec. 1, 1998, pp. 1921-1935; XP-027120415.

B.B. Chaudhuri et al., "Detection and Grdation of Oriented Texture", Pattern Recognition Letter, vol. 14, No. 2, Feb. 1, 1993, pp. 147-153, XP-000338573.

Hideyuki Tamura et al., Textural Features Corresponding to Visual Perception, IEEE Transactions on Systems, Man, and Cybernetics, vol. 8, No. 6, Jan. 1, 1978, pp. 460-473, XP-55011441.

F. Chabat, "A Corner Orientation Detector", Image and Vision Computing, vol. 17, No. 10, Aug. 1, 1999, pp. 761-769, XP 55011618.

Kjell Brunnstrom et al., "Active Detection of Classificatin of Juctions by Foveation With a Head-Ey System Guided by the Scale-Space Primal Sketch", Lecture Note I Comuter Science, vol. 588/1992, 1992, pp. 701-709, XP-09153838.

Notification Concerning Transmittal of International Preliminary Report on Patentability (Forms PCT/IB/326 and PCT/IB/373) and the Written Opinion of the International Searching Authority (Form PCT/ISA/237) dated Feb. 28, 2013, issued in corresponding International Application No. PCT/GB2011/051486. (10 pages).

* cited by examiner

SENSOR DATA PROCESSING

RELATED APPLICATIONS

This application is a national phase application filed under 35 USC §371 of PCT Application No. PCT/GB11/51486 with an International filing date of Dec. 7, 2012 which claims priority of EP Patent Application 10251463.5 filed Aug. 19, 2010 and GB Patent Application 1013870.9 filed Aug. 19, 2010. Each of these applications is herein incorporated by reference in their entirety for all purposes.

FIELD OF THE INVENTION

The present invention relates to processing of sensor data.

BACKGROUND

Systems are available to autonomously gather high resolution visible band imagery over wide areas of terrain under surveillance, and to process these images to detect objects of potential interest.

However, if the scene under surveillance is complex, a large number of potential targets may be identified, not all of which are actually of interest. Those identified objects that are not of interest are typically referred to as "clutter".

A system may be made more complex to improve its ability to reject clutter. However, there is an associated computational cost that may not be acceptable in a resource limited system, for instance, in an airborne application.

A conventional alternative approach is to have a post detection phase of processing for clutter rejection, so that initial, relatively crude discrimination is achieved by an initial detection stage, followed by more sophisticated discrimination at a later clutter rejection stage. The clutter rejection process is only applied to image regions of interest identified by the detection phase, thus limiting the computational cost of this phase.

Clutter rejection algorithms have been developed by a number of investigators for different optical sensor applications. However, these systems make use of manual cues for a target, or of differences between target and background size and dynamics to reject clutter (and so tend not to be suitable for autonomous sensor system capturing images at a low frame rate). Other existing clutter rejection systems use large amounts of data to determine the characteristics of clutter and target objects that allow reliable discrimination to occur (and so tend to need large amounts of training data, and/or time consuming algorithm training or re-training to accommodate different operating environments).

SUMMARY OF THE INVENTION

In a first aspect, the present invention provides a method of processing sensor data, the method comprising: (i) using a sensor, measuring values of a parameter over a region of interest to produce an image of the region of interest, the image comprising a plurality of pixels; (ii) for each pixel, determining an orientation of a gradient of the parameter, at that pixel, using the measured parameter values; (iii) for each of a plurality of predetermined ranges of gradient orientation values, determining a number of pixels that have a gradient orientation value within that range; (iv) identifying the predetermined ranges that correspond to a number of pixels above a threshold value; and (v) for each identified predetermined range, identifying as corresponding to a feature of an object, pixels that have gradient orientation values within that predetermined range.

The threshold value may be determined using the following formula:

$$\tau_{EOH} = \mu_{EOH} + \eta_2 \sqrt{\mu_{EOH}}$$

where:
$\tau_{EOH}$ is the threshold value;
$\mu_{EOH}$ is an expected number of pixels per predetermined range, if the region of interest comprised only a random noise field; and
$\eta_2$ is a predetermined confidence level.

The method may further comprise: for each pixel, determining a value for a magnitude of a gradient of the parameter, at that pixel, using the measured parameter values; wherein steps (iii)-(v) are only performed for pixels having gradient magnitude values greater than a gradient magnitude threshold.

The gradient magnitude threshold may be derived from $\chi^2$ statistics of the square of a standard deviation of the parameter over the region of interest.

The gradient magnitude threshold may be determined using the following formula:

$$T_1 = \frac{3\sigma_B^2}{16} \chi_{0.99}^2$$

where:
$T_1$ is the gradient magnitude threshold;
$\sigma_B$ is an estimate of the standard deviation of the parameter over the region of interest; and
$\chi_{0.99}^2$ is the 99% point for a Chi-squared distribution with 2 degrees of freedom.

A first pixel having a gradient orientation value in a first predetermined range, the first predetermined range comprising a number of pixels above the threshold value, may be identified as corresponding to a different feature of the object that a second pixel corresponds to, the second pixel having a gradient orientation value in a second predetermined range, the second predetermined range comprising a number of pixels above the threshold value, if there is a third predetermined range between the first predetermined range and second predetermined range, the third predetermined range not comprising a number of pixels above the threshold value.

The method may further comprise determining a number of different object features.

The method may further comprise identifying the object as an object of interest using the determined number of object features.

The features of the object may be edges of the object.

A size of a predetermined range may be determined using the following formula:

$$BinSize \approx 4\frac{\sigma_G}{G}$$

where:
BinSize is the size of a predetermined range;
G is the mean value of the gradient magnitude values that exceed the gradient magnitude threshold; and
$\sigma_G$ is the standard deviation of G.

The method may further comprise a performance assessment process, the performance assessment process comprising estimating an average number of object features that exceed the threshold as a function of object contrast and size.

In a further aspect, the present invention provides apparatus for processing sensor data, the apparatus comprising: a sensor for measuring values of a parameter over a region of interest to produce an image of the region of interest, the image comprising a plurality of pixels; and one or more processors arranged to: for each pixel, determine a value for an orientation of a gradient of the parameter, at that pixel, using the measured parameter values; for each of a plurality of predetermined ranges of gradient orientation values, determine a number of pixels that have a gradient orientation value within that range; identify the predetermined ranges that correspond to a number of pixels above a threshold value; and for each identified predetermined range, identify as corresponding to a feature of an object, pixels that have gradient orientation values within that predetermined range.

In a further aspect, the present invention provides an aircraft comprising apparatus according to the above aspect.

In a further aspect, the present invention provides a program or plurality of programs arranged such that when executed by a computer system or one or more processors it/they cause the computer system or the one or more processors to operate in accordance with the method of any of the above aspects.

In a further aspect, the present invention provides a machine readable storage medium storing a program or at least one of the plurality of programs according to the above aspect.

DETAILED DESCRIPTION

Figure 1:
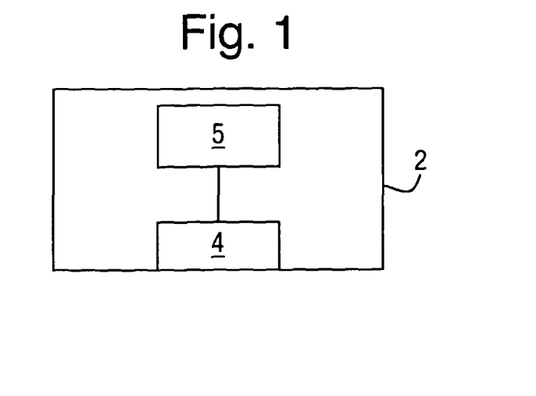
FIG. 1 is a schematic illustration (not to scale) of an aircraft that will implement an embodiment of a target detection and processing algorithm.

FIG. 1 is a schematic illustration (not to scale) of an aircraft 2 that will implement an embodiment of a target detection and processing algorithm (described in more detail later below with reference to FIG. 3).

In this embodiment, the aircraft 2 is an unmanned aircraft. The aircraft 2 comprises a sensor 4 and a processor 5.

In this embodiment, the sensor 4 is a camera. As the aircraft 2 flies over an area of terrain, the sensor 4 is arranged to capture high resolution visible band images of the area of terrain, as described in more details later below with reference to FIG. 2. The sensor 4 is coupled to the processor 5.

In this embodiment, data corresponding to the images captured by the sensor 4 is sent from the sensor 4 to the processor 5. The processor performs the target detection and processing algorithm (described in more detail later below with reference to FIG. 3) on the received data.

Figure 2:
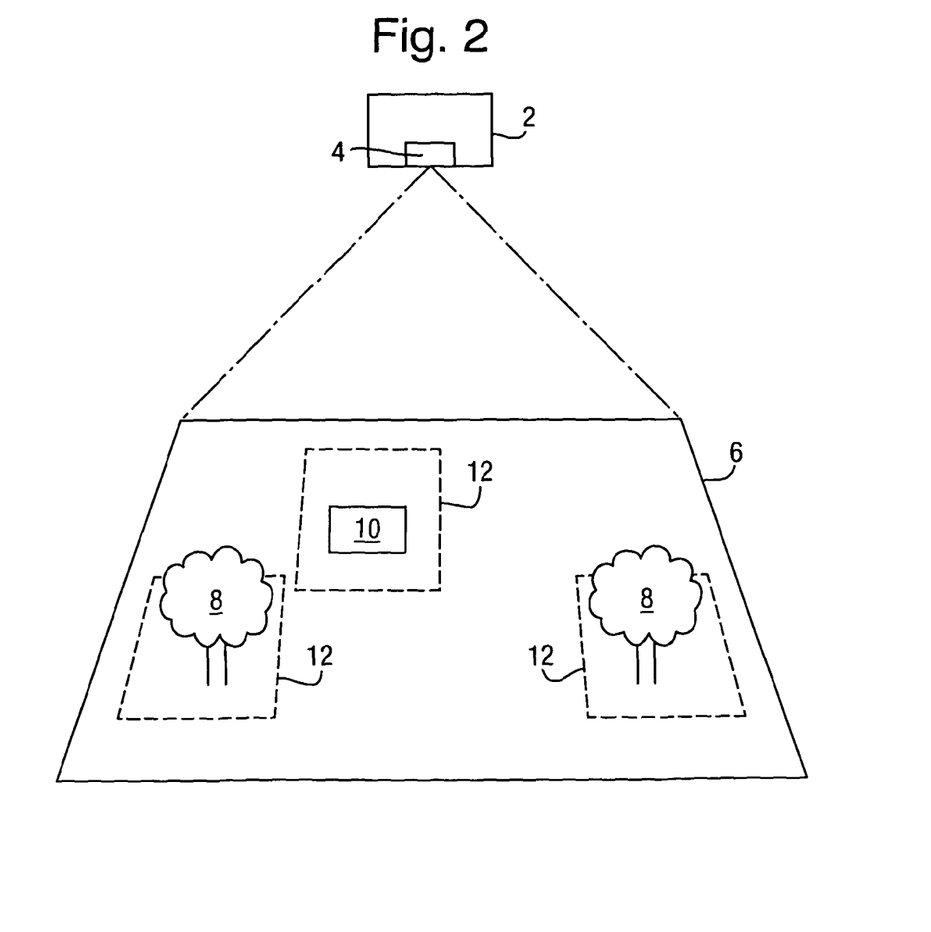
FIG. 2 is a schematic illustration of a scenario in which the aircraft will be used to implement the embodiment of the target detection and processing algorithm.

FIG. 2 is a schematic illustration of a scenario in which the aircraft 2 will be used to implement the embodiment of the target detection and processing algorithm.

In this scenario, the aircraft 2 flies over the area of terrain 6.

In this scenario, the area of terrain 6 comprises a target 10 to be detected by the aircraft 2 using the target detection and processing algorithm, and a plurality of objects and/or terrain features from which the target is to be distinguished. The plurality of objects and/or terrain features will hereinafter be referred to as "the objects" and are indicated in FIG. 2 by reference numeral 8.

In this scenario, the target 10 is a man-made object. Also, the target 10 is moveable over the terrain. For example, the target 10 is a car, tank, or other land-based vehicle.

In this scenario, the objects 8 are not man-made objects. For example, the objects are trees or other naturally occurring objects or terrain features.

As the aircraft 2 flies over the area of terrain 6, the sensor 4 gathers high resolution visible band images of the area of terrain 6. In this scenario, the images are conventional greyscale images.

The processor 5 implements the target detection and processing algorithm (described in more detail later below with reference to FIG. 3) on data corresponding to the images gathered by the sensor 4 as described. In this scenario, the target detection and processing algorithm is implemented to facilitate the detection and tracking of the target 10 by the aircraft 2.

In addition to the above described features, FIG. 2 shows three "regions of interest" (indicated by a dotted lines and the reference numeral 12). The regions of interest will be described in more detail later below with reference to FIG. 3.

Figure 3:
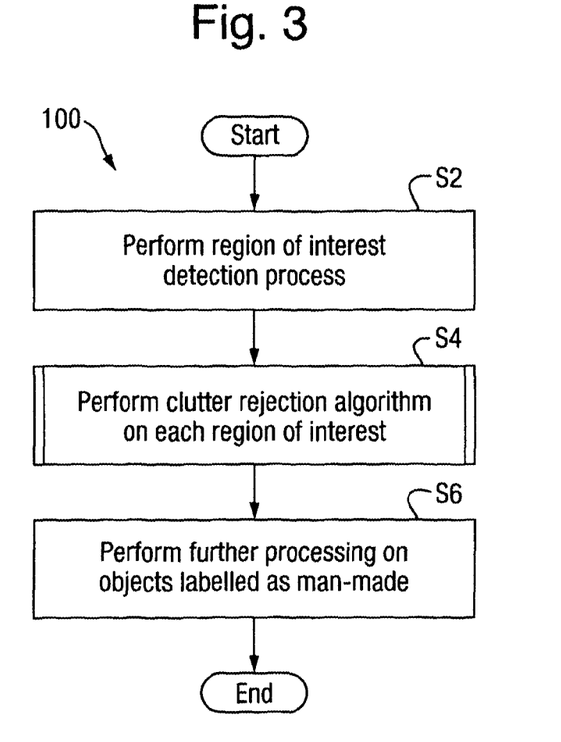
FIG. 3 is a process flow chart showing certain steps of an embodiment of the target detection and processing algorithm.

FIG. 3 is a process flow chart showing certain steps of this embodiment of the target detection and processing algorithm 100.

At step s2, the processor 5 performs a region of interest detection process on the data received from the sensor 4. The region of interest detection algorithm is a conventional algorithm. In this embodiment, the region of interest detection algorithm implements relatively crude discrimination to identify one or more regions of the area of terrain 6 in which the target 10 may be present (i.e. the regions of interest 12 shown in FIG. 2).

At step s4, for each region of interest 12 identified at step s2 above, the processor 5 performs a clutter rejection algorithm. The clutter rejection algorithm is described in more detail later below with reference to FIG. 4. In this embodiment, the clutter rejection algorithm identifies objects and labels each identified object as "man-made" or "clutter".

At step s6, further conventional processing steps are performed on the objects labelled as "man-made" in step s4. Such further processing steps may be implemented for the purposes of e.g. target recognition, target tracking etc.

Figure 4:
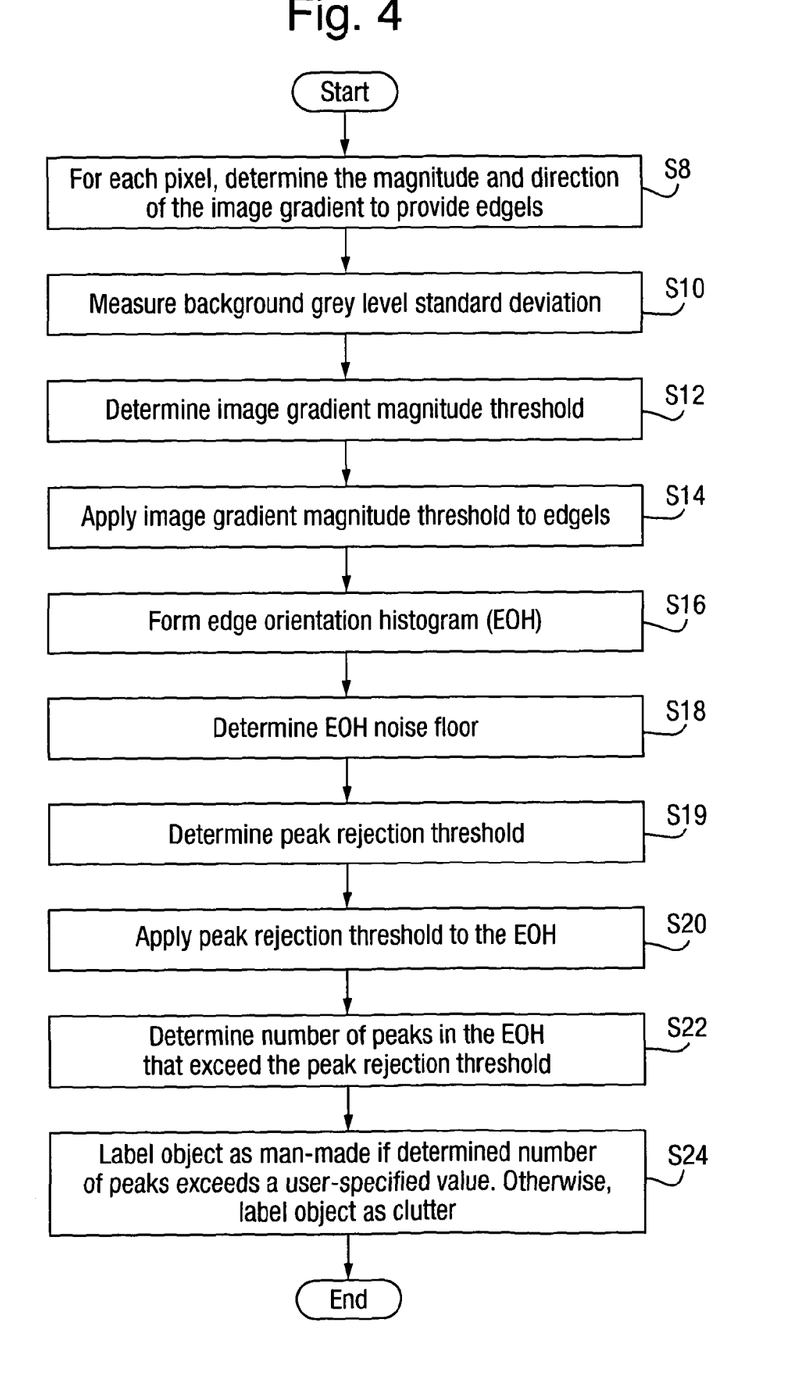
FIG. 4 is a process flow chart showing certain steps of clutter rejection algorithm performed at step s4 of the target detection and processing algorithm.

FIG. 4 is a process flow chart showing certain steps of clutter rejection algorithm performed at step s4 of the target detection and processing algorithm 100. The clutter rejection algorithm performed is described as being performed for a single region of interest 12. However, in operation the clutter rejection algorithm is performed for each region of interest 12 identified at step s2 above.

At step s8, for each pixel in a single region of interest 12 a magnitude of the gradient of the greyness of the image, and a direction of the gradient of the greyness of the image, are determined. In this embodiment, the terminology "greyness" is used to refer to the intensity of the image.

In this embodiment, the gradient of the greyness at a pixel is determined using greyness levels at pixels neighbouring the pixel of interest. A direction of the gradient is determined using values for gradients of the greyness over the pixel of interest in x and y directions.

In this embodiment, step s8 is performed using conventional techniques, for example by applying an image gradient operator to the region of interest 12 e.g. by applying vertical and horizontal Sobel operators to the region of interest 12.

The determined gradient magnitude and gradient direction at each pixel is hereinafter referred to as an "edgel".

At step s10, a value of a background grey level standard deviation in the region of interest 12 is estimated. In this embodiment step s10 is performed using conventional techniques. The estimated background grey level standard deviation is a single value for the whole of the region of interest that indicates how greyness changes over the whole image.

At step s12, an image gradient threshold is determined.

In this embodiment, the image gradient magnitude threshold is derived from $\chi^2$ statistics of the square of the background grey level standard deviation (estimated at step s10 above). In this embodiment, the image gradient magnitude threshold $T_1$ is determined using the following formula:

$$T_1 = \frac{3\sigma_B^2}{16} \chi_{0.99}^2$$

where:
  $\sigma_B$ is the estimate of the background grey level standard deviation for the region of interest 12; and
  $\chi_{0.99}^2$ is the 99% point for a Chi-squared distribution with 2 degrees of freedom.

At step s14, the image gradient magnitude threshold $T_1$ determined at step s12 is applied to the edgels determined at step s8. In this embodiment, edgels having a gradient value less than the image gradient magnitude threshold $T_1$ are rejected. This process of rejecting edgels less than the image gradient magnitude threshold tends to remove edgels that may be due to random variation in the region if interest 12, i.e. due to background effects and not due to the presence of an object.

At step s16, a histogram is formed of the edgels that have a gradient magnitude exceeding the image gradient magnitude threshold $T_1$, i.e. the edgels not rejected at step s14. This histogram is hereinafter referred to as the Edge Orientation Histogram (EOH).

In this embodiment, the bin size of the EOH is matched to the variation in the edgel orientation due to image noise given the expected effect of noise on an estimate of gradient orientation made at step s8 using, for example, a Sobel Operator. In this embodiment, the bin size of the EOH is determined using the following formula.

$$BinSize = 4\sigma_y \approx 4\frac{\sigma_G}{G}$$

where:
  $\sigma_y$ is the standard deviation in the estimated edgel orientation g;
  G is the mean gradient of the edgels that have a gradient magnitude exceeding the image gradient magnitude threshold $T_1$; and
  $\sigma_G$ is the standard deviation of G. In this embodiment, $\sigma_G$ is calculated using the following formula:

$$\sigma_G^2 \approx \sigma_{\partial I/\partial x}^2 = \frac{3\sigma_B^2}{16}$$

where:
  $\sigma_{\partial I/\partial x}$ is the expected standard deviation of the gray gradient estimate.

Figure 5:
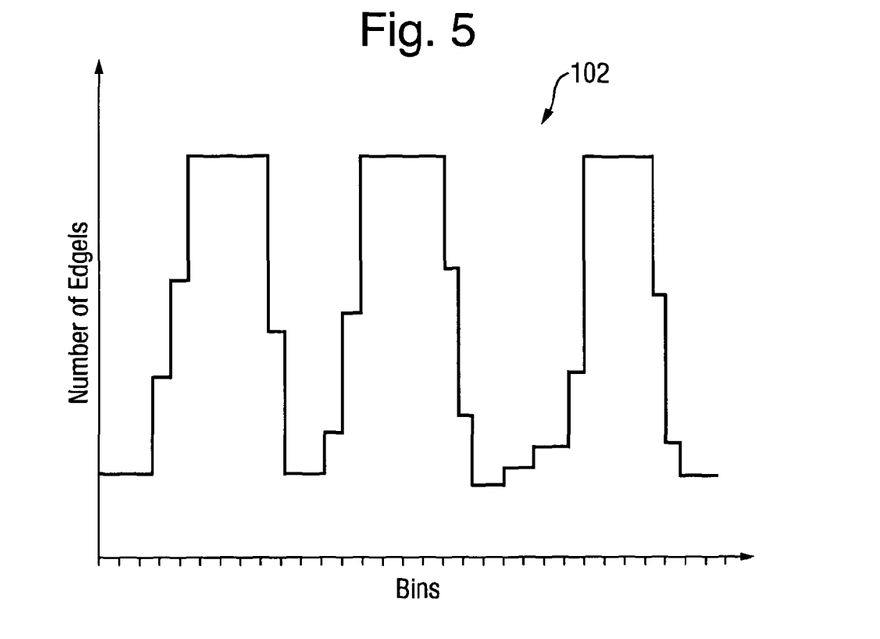
FIG. 5 is a schematic illustration (not to scale) of an Edge Orientation Histogram.

FIG. 5 is a schematic illustration (not to scale) of an Edge Orientation Histogram (EOH) 102 for this embodiment.

At step s18, the expected number of votes per histogram bin, if the region of interest 12 being processed comprised only a random noise field, is determined.

In this embodiment, the standard deviation of the random noise filed is equal to that measured for the image (i.e. $\sigma_B$ determined at step s10). This value of the expected number of votes per histogram bin is hereinafter referred to as the EOH noise floor.

In this embodiment, the EOH noise floor is determined using the following information.

The distribution of random votes in the EOH 102 due to edgels generated by background noise is uniform between −179 and +180 degrees.

Therefore, the probability density function of this distribution is flat with a mean value of 1/360=0.0028.

Therefore, the probability of an edgel voting in a bin at random is:

P(one edgel in bin)=pdf_mean*BinSize where:
  pdf_mean is 0.0028 as mentioned above; and
  BinSize is as determined at step s16 above.

Therefore, the number of pixels required to ensure at least on random vote in a bin is:

$$Npix(\text{one per bin}) = \frac{1}{P(\text{one edgel in bin})}$$

Thus, the mean number of random votes per bin is:

$$\text{Mean}(\text{votes\_per\_bin}) = \frac{Npixels}{Npix(\text{one per bin})}$$
$$= Npixels * P(\text{one edgel in bin})$$
$$= \frac{Npixels}{Nbins}$$

where Npixels is the total number of pixels in the region of interest 12 being processed, and Nbins is the number of bins.

In this embodiment, it is assumed that random voting in the bins of the EOH 102 is a Poisson process. Therefore, the variance of the number of random votes per bin is equal to the mean number of random votes per bin, i.e.

Variance(votes_per_bin)=Mean(votes_per_bin)

The EOH noise floor $\mu_{EOH}$ is determined using the following formula:

$\mu_{EOH}$=Mean(votes_per_bin)+$\eta_1$
$\sqrt{\text{Mean(votes\_per\_bin)}}$ where $\eta_1$ is the confidence level for rejecting random votes.

At step s19, a threshold for rejecting a peak in the EOH 102 that has been caused by chance (i.e. random noise), rather than the presence of an object edge, is determined. This threshold is hereinafter referred to as the "peak rejection threshold". In this embodiment, the peak rejection threshold is determined using the following formula:

$\tau_{EOH}$=$\mu_{EOH}$+$\eta_2\sqrt{\mu_{EOH}}$ where:
  $\tau_{EOH}$ is the EOH peak rejection threshold at the $\eta_2\sigma$ confidence level;
  $\mu_{EOH}$ is the EOH noise floor determined at step s18; and $\eta_2$ is a required confidence level. In this embodiment, $\eta_2$ is a user-specified confidence level. Also, in this embodiment the value of $\eta_2$ is 2. This value corresponds to a confidence level of approximately 95%. However, in other embodiments, different values of $\eta_2$ are used. For example, a value of 3 may be used for $\eta_2$. A value of 3 corresponds to a confidence level of approximately 99%.

At step s20, the peak rejection threshold $\tau_{EOH}$ is applied to the EOH 102.

Figure 6:
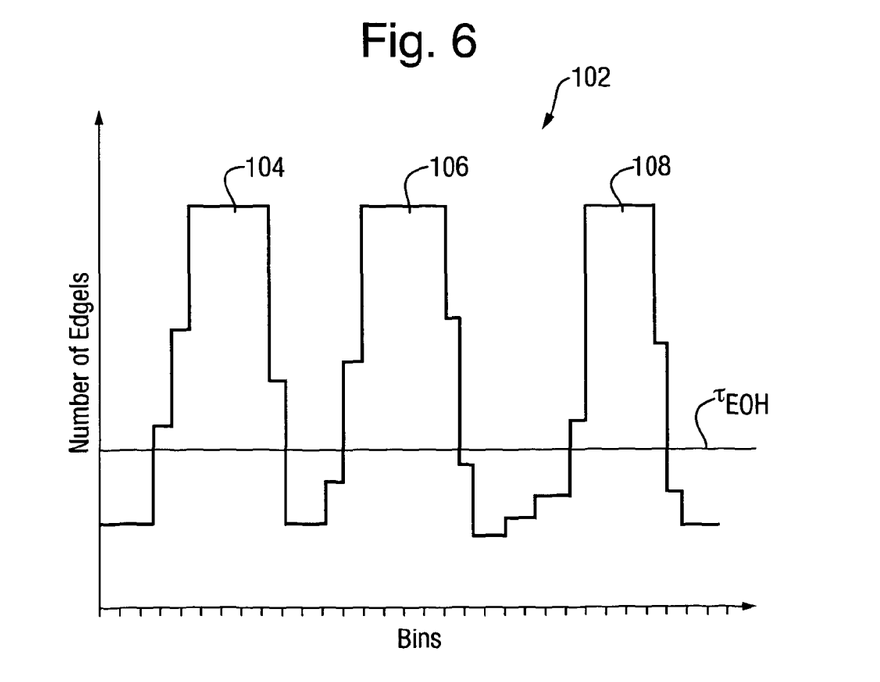
FIG. 6 is a schematic illustration (not to scale) showing a peak rejection threshold applied to the Orientation Histogram.

FIG. 6 is a schematic illustration (not to scale) showing the peak rejection threshold $\tau_{EOH}$ applied to the EOH 102.

At step s22, the number of peaks of the EOH 102 that exceed the peak rejection threshold $\tau_{EOH}$ are counted. In this embodiment, there are three peaks of the EOH 102 that exceed the peak rejection threshold $\tau_{EOH}$. These peaks are indicated in FIG. 6 by the reference numerals 104, 106, and 108.

The terminology "peak" is used herein to refer to a group of predetermined ranges that satisfies the following criteria. Firstly, each predetermined range in the group has a number of pixels above a threshold value. Secondly, if the group comprises more than one predetermined range, each predetermined range in that group is contiguous with (i.e. is directly adjacent to) at least one other predetermined range in that group.

At step s24, if the number of peaks 104, 106, 108 of the EOH 102 that exceed the peak rejection threshold $\tau_{EOH}$ (i.e. the number of peaks counted at step s22) greater than or equal to a user defined threshold, then the object in the region of interest 12 being processed is labelled as "man-made". In other words, the object in the region of interest 12 being processed is identified as the target 10.

Also, in this embodiment, if the number of peaks 104, 106, 108 of the EOH 102 that exceed the peak rejection threshold $\tau_{EOH}$ is less than a user defined threshold, then the object in the region of interest 12 being processed is labelled as "clutter". In other words, the object in the region of interest 12 being processed is labelled as an object 8 that is of no interest to the user.

In this embodiment, the user-defined threshold for the number of peaks exceeding the peak rejection threshold $\tau_{EOH}$ is 3. Thus, the edges identified in the region of interest 12 corresponding to the EOH 102 shown in FIGS. 5 and 6 are determined to belong to the target 10. In other embodiments, a different value for the threshold for the number of peaks exceeding the peak rejection threshold $\tau_{EOH}$ is used. For example, a stricter test would require that 4 peaks exceed the peak rejection threshold $\tau_{EOH}$ for the object to be identified as man-made (i.e. the target 10).

In other embodiments, step s24 may be performed in a different manner. For example, in other embodiments step s24 may be performed as follows.

Firstly, it is determined how many peaks exceeding the peak rejection threshold $\tau_{EOH}$ contain a sufficient number of pixels to be consistent with the physical size of the man-made objects of interest. This test may be derived from a known pixel footprint size and the physical size of the man-made objects of interest.

Secondly, it is determined if the number of peaks identified in the first step (above) is greater than or equal to a user-specified threshold. If the number of identified peaks is greater than this user-specified threshold, then the object is labelled as "man-made". Otherwise, it is labelled as "clutter".

Thus, a target detection and processing algorithm comprising a clutter rejection algorithm is provided.

An advantage provided by the above described processes is that relatively high processing efficiency tends to be provided. Thus, it tends to be possible to process a large number of reports from the detection stage (step s2) in real-time.

A further advantage is that good discrimination performance tends to provided. Thus, it tends to be provided that further processing steps (step s6) are only performed on objects of interest (e.g. the target 10) only and very few clutter objects 8.

A further advantage is that reliable and robust performance tends to be provided. The overall system tends to behave in a reliable way at runtime.

A further advantage is that performance that can tends to able to be readily modelled to allow overall system design to be optimised without exhaustive experimentation.

A further advantage is that the need for large amounts of training data, and/or time consuming algorithm training or re-training to accommodate different operating environments tends to be avoided. In other words, the above described algorithms tend to be easy to train compared to conventional approaches.

A further advantage is that any tuning to optimise discrimination performance tends to be relatively easy to perform compared to conventional approaches. Preferably, this would be performed automatically, without requiring large training sets or a lot of manual intervention.

The above described approach advantageously tends to exploit the tendency for man-made objects to contain a relatively large numbers of straight lines (both on and within the boundary of the object), irrespective of the direction that they are observed from. Hence, the measured edgel content, i.e. the pixels where the image gray level gradient content is high, of the input image is advantageously used to discriminate between the man-made and clutter objects on the basis of an edge content measure. This approach advantageously tends to avoid or eliminate the need for large amounts of clutter and target training data as the decision threshold is determined from general expectations regarding the number of lines and edges on a man-made object. For example, a large class of man-made objects of interest are broadly cuboid in shape, which provides some expectation of the number of observable lines/edges in an image, their relative orientation and, assuming object size is known, the expected number of edgels per line.

A further advantage provided by the above described processes is that a statistical confidence level, rather than an absolute threshold, is used as the peak rejection threshold. Thus, the technique tends to adapt to variability in an image rather than being a fixed value.

Apparatus, including the processor 5, for implementing the above arrangement, and performing the above described method steps, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media. Moreover, any number of these elements of the apparatus may be on-board or remote from the aircraft 2.

It should be noted that certain of the process steps depicted in the flowcharts of FIGS. 3 and 4 and described above may be omitted or such process steps may be performed in differing order to that presented above and shown in the Figures. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, an unmanned aircraft implements the above described target detection and processing algorithm. However, in other embodiments the algorithm may be implemented for a different type of vehicle or other entity that may be moving/moveable or stationary. For example, in other embodiments the target detection and processing algorithm may be implemented for a manned aircraft, a land-based vehicle (e.g. a car or tank), or from a building.

In the above embodiments, the sensor is a camera arranged to gather visible-band greyscale images. However, in other embodiments the sensor may be a different type of sensor and/or may be arranged to gather a different type of image. For example, in other embodiments, the sensor may be an infra-red camera, or a laser scanner arranged to measure distances from the scanner to the terrain.

In the above embodiments, the target detection and clutter rejection algorithms are implemented in the scenario described above with reference to FIG. 2. However, in other embodiments the algorithms may be implemented in any appropriate scenario to detect a target and/or reject or reduce clutter. Furthermore, the particular scenario in which the algorithms are implemented comprises a single target and a plurality of clutter objects. However, in other scenarios there may be any number of targets and/or any number of clutter objects.

In the above embodiments, the target is a man-made object that is moveable over the terrain. Also, the clutter objects are stationary non-man-made objects. However, in other embodiments the target may be a different type of target e.g. a stationary man-made object (e.g. a building). Also, in other embodiments one or more of the clutter objects may be a different type of object e.g. a moving non-man-made object (e.g. an animal). Furthermore, in other embodiments, the target may be a non man-made object. Also, the clutter objects (i.e. objects that are not of interest to the user) may be man-made. In embodiments in which a target is non-man-made, and clutter objects are man-made, the target may, for example, be identified by being an object corresponding to an EOH having a number of peaks above the peak rejection threshold that is below the user specified threshold of step s24.

In the above embodiments, the image gradient magnitude threshold is determined using the formula specified at step s12. However, in other embodiments the image gradient magnitude threshold is specified differently, e.g. using a different appropriate formula.

In the above embodiments, the bin size of the Edge orientation Histogram is determined using the formula specified at step s16. However, in other embodiments the bin size is specified differently, e.g. using a different appropriate formula.

In the above embodiments, the noise floor for the Edge orientation Histogram is determined using the formula specified at step s18. However, in other embodiments the noise is specified differently, e.g. using a different appropriate formula.

In the above embodiments, the peak rejection threshold is determined using the formula specified at step s19. However, in other embodiments the peak rejection threshold is specified differently, e.g. using a different appropriate formula.

In the above embodiments, the threshold that is applied to the number of peaks of the EOH exceeding the peak rejection threshold (applied at step s24 above) is a user specified threshold. However, in other embodiments this threshold may be specified in a different way. For example, this threshold may be a result of a different process (e.g. a computer process) that may be separate to the above described target detection and/or clutter rejection algorithms. Also, in other embodiments this threshold may be applied in a different way. For example, in other embodiments an object may be classified as:

(i) "man-made" if the number of peaks exceeding the peak rejection threshold is greater than the specified threshold;

(ii) "clutter" if the number of peaks exceeding the peak rejection threshold is less than the specified threshold; or (iii) "unknown" if the number of peaks exceeding the peak rejection threshold is equal to the specified threshold.

In other embodiments, an additional optional performance assessment process may be performed to advantageously assess the performance of the target detection and processing algorithm. In an example performance assessment process, some or all of the above equations for specifying the image gradient magnitude threshold, the noise floor, and the peak rejection threshold can be used in a simulation to predict the EOH noise floor and detection threshold as a function of different object contrast values for a specified image noise level. A Monte Carlo simulation can then be used to predict an average number of image edges/lines that exceed the EOH detection threshold as a function of object contrast and size. This advantageously tends to allow the minimum object size for reliable classification to be predicted. This, in turn, tends to allow a sensor system to be specified that allows a required level of clutter classification to be achieved.

In the above embodiments, a target is identified based on the number of identified straight edges in a region of interest. However, in other embodiments, other properties of the identified edges within an image may be used to classify objects.

For example, the achieved man-made and clutter object labelling performance may be improved by analysing the relative orientation of significant peaks in the EOH, e.g. by looking for evidence of significant parallel lines and right angles (features of this type tend to be characteristic of man-made objects).

In other embodiments, the angular separation between pairs of peaks in the edge orientation histogram (i.e. the difference between the orientation of the gradient corresponding to the pixels in a first peak and the orientation of the gradient corresponding to the pixels in a second peak) is analysed to determine the presence of parallel lines pairs or line pairs corresponding to right angle corners. An object is then declared as being man-made if the number of right angles and/or straight lines in an image is above a predefined threshold.

Furthermore, in other embodiments the distortion of right angles and parallel lines within an image (e.g. due to image perspective) is advantageously accounted for. For example, rather than detecting the presence of 90 degree orientation differences between peaks, a different angular orientation difference is detected for, e.g. an angular difference that corresponds to a right angle under the perspective distortion that the image is subject to. This perspective distortion may be determined is any appropriate way, e.g. using standard techniques applied to sensor pointing data, or from standard analysis applied to the image.

Furthermore, in other embodiments if there are three or more peaks in the edge orientation histogram, the above described technique may be advantageously used to test for the presence of a pair of lines at right angles in the horizontal plane and also a pair of right angle lines in the vertical plane.

Thus, the presence of a three dimensional corner in the region of interest may be detected. The presence of such a feature tends to be a particularly strong indicator of the presence of a man-made object.

For the purposes of clarity and ease of understanding, in the above embodiments the target detection and processing algorithm has been described in terms of histograms and thresholds applied to said histograms. However, in other embodiments, one or more different types of graphical representations of data are used instead of or in addition to a histogram during the performance of the algorithm. Also, in other embodiments, the target detection and processing algorithm is performed without explicitly generating or producing a histogram or other graphical representation of data.

What is claimed is:

1. An automated method of processing sensor data, the method comprising:
   (i) using a sensor to measure values of a parameter over a region of interest to produce an image of the region of interest, the image having a plurality of pixels, a sensor electronic transmitter device connected to said sensor and receiving said values of a parameter from said sensor, said sensor electronic transmitter device sending digital values of said parameter for each said pixel of each said image to a memory of one or more processors, said memory storing said digital values of said pixels of said image for processing in real time, said one or more processors performing the steps of:
   (ii) for each pixel, determining an orientation of a gradient of the parameter, at that pixel, using the measured parameter values;
   (iii) for each of a plurality of predetermined ranges of gradient orientation values, determining a number of said pixels that have a gradient orientation value within that range;
   (iv) determining a number of groups of predetermined ranges, wherein each group of predetermined ranges is determined such that it satisfies a criteria that:
   for each predetermined range in that group, a number of said pixels that have a gradient orientation value within that range is above a threshold value;
   if that group contains more than one predetermined range, each predetermined range in that group is contiguous with at least one other predetermined range in that group; and
   for each group, the one or more predetermined ranges in that group are not contiguous with any of the predetermined ranges in a different group; and
   (v) using the determined the number of groups, discriminating between the presence of a man-made object and clutter in the image; wherein
   an object in the region of interest is labeled as man-made if the number of groups is greater than or equal to a further threshold, and is otherwise labeled as clutter.

2. A method according to claim 1, wherein the threshold value is determined using a formula:

$$\tau_{EOH} = \mu_{EOH} + \eta_2 \sqrt{\mu_{EOH}}$$

where:
  $\tau_{EOH}$ is the threshold value;
  $\mu_{EOH}$ is an expected number of pixels per predetermined range, if the region of interest contained only a random noise field; and
  $\eta_2$ is a predetermined confidence level.

3. A method according to claim 1, comprising:
   for each pixel, determining a value for a magnitude of a gradient of the parameter, at that pixel, using the measured parameter values; wherein
   steps (iii)-(v) are only performed for pixels having gradient magnitude values greater than a gradient magnitude threshold.

4. A method according to claim 3, wherein a size of a predetermined range is determined using a formula:

$$BinSize \approx 4 \frac{\sigma_G}{G}$$

where:
  BinSize is a size of a predetermined range;
  G is a mean value of the gradient magnitude values that exceeds the gradient magnitude threshold; and
  $\sigma_G$ is the standard deviation of G.

5. A method according to claim 3, wherein the gradient magnitude threshold is derived from $\chi^2$ statistics of a square of a standard deviation of the parameter over the region of interest.

6. A method according to claim 5, wherein the gradient magnitude threshold is determined using a formula:

$$T_1 = \frac{3\sigma_B^2}{16} \chi_{0.99}^2$$

where:
  $T_1$ is the gradient magnitude threshold;
  $\sigma_B$ is an estimate of the standard deviation of the parameter over the region of interest; and
  $\chi_{0.99}^2$ is a 99% point for a Chi-squared distribution with 2 degrees of freedom.

7. A method according to claim 1, comprising:
   for each pair of groups of predetermined ranges, determining a difference between the orientation of the gradient of the parameter of the pixels in a first group of a pair of groups and the orientation of the gradient of the parameter of the pixels in a second group of the pair of groups, wherein
   the discriminating between the presence of a man-made object and clutter in the image uses the determined differences.

8. A method according to claim 7, comprising:
   determining the number of pairs of groups for which the determined difference in orientation is equal to a right angle; wherein the discriminating between the presence of a man-made object and clutter in the image uses the determined number of pairs of groups for which the determined difference in orientation is equal to a right angle.

9. A method according to claim 7, comprising:
   determining the number of pairs of groups for which the determined difference in orientation is equal to a straight line; wherein
   the discriminating between the presence of a man-made object and clutter in the image uses the determined number of pairs of groups for which the determined difference in orientation is equal to a straight line.

10. A method according to claim 1, wherein each predetermined range is a bin of a histogram; and
   each group of predetermined ranges includes a peak of the histogram, the peak being above the threshold value.

11. A method according to claim 1, comprising:
a performance assessment process, the performance assessment process including estimating an average number of object features that exceed the threshold value as a function of object contrast and size.

12. Apparatus for processing sensor data, the apparatus comprising:
a sensor for measuring values of a parameter over a region of interest to produce an image of the region of interest, the image having a plurality of pixels; and
a sensor electronic transmitter device connected to said sensor and receiving said values of a parameter from said sensor, said sensor electronic transmitter device sending digital values of said parameter for each said pixel of each said image to a memory of one or more processors, said memory storing said digital values of said pixels of said image for processing in real time;
said one or more processors arranged to:
for each pixel, determine an orientation of a gradient of the parameter, at that pixel, using the measured parameter values;
for each of a plurality of predetermined ranges of gradient orientation values, determine a number of said pixels that have a gradient orientation value within that range;
determine a number of groups of predetermined ranges, wherein each group of predetermined ranges is to satisfy a criteria that:
for each predetermined range in that group, the number of said pixels that have a gradient orientation value within that range is above a threshold value;
if that group comprises more than one predetermined range, each predetermined range in that group is contiguous with at least one other predetermined range in that group; and
for each group, the one or more predetermined ranges in that group are not contiguous with any of the predetermined ranges in a different group; and
using the determined the number of groups, discriminate between presence of a man-made object and clutter in the image; wherein
an object in the region of interest is labeled as man-made if the number of groups is greater than or equal to a further threshold, and is otherwise labeled as clutter.

13. An aircraft comprising the apparatus according to claim 12.

14. An automated machine readable storage medium storing in a non-transitory medium a program or a plurality of programs for causing a computer to execute a method which comprises:
(i) using a sensor to measure values of a parameter over a region of interest to produce an image of the region of interest, the image having a plurality of pixels, a sensor electronic transmitter device connected to said sensor and receiving said values of a parameter from said sensor, said sensor electronic transmitter device sending digital values of said parameter for each said pixel of each said image to a memory of one or more processors of said computer, said memory storing said digital values of said pixels of said image for processing in real time, said one or more processors performing the steps of:
(ii) for each pixel, determining an orientation of a gradient of the parameter, at that pixel, using the measured parameter values;
(iii) for each of a plurality of predetermined ranges of gradient orientation values, determining a number of said pixels that have a gradient orientation value within that range;
(iv) determining a number of groups of predetermined ranges, wherein each group of predetermined ranges is determined such that it satisfies a criteria that:
for each predetermined range in that group, a number of said pixels that have a gradient orientation value within that range is above a threshold value;
if that group contains more than one predetermined range, each predetermined range in that group is contiguous with at least one other predetermined range in that group; and
for each group, the one or more predetermined ranges in that group are not contiguous with any of the predetermined ranges in a different group; and
(v) using the determined the number of groups, discriminating between the presence of a man-made object and clutter in the image; wherein
an object in the region of interest is labeled as man-made if the number of groups is greater than or equal to a further threshold, and is otherwise labeled as clutter.

* * * * *